United States Patent
Pedlow, Jr. et al.

(10) Patent No.: US 7,644,424 B2
(45) Date of Patent: Jan. 5, 2010

(54) LOCATION DETECTOR FOR DIGITAL CABLE TELEVISION APPLIANCES

(75) Inventors: Leo M. Pedlow, Jr., Ramona, CA (US); Aran London Sadja, La Jolla, CA (US); Eric James Holcomb, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 744 days.

(21) Appl. No.: 11/085,369

(22) Filed: Mar. 21, 2005

(65) Prior Publication Data

US 2005/0289585 A1    Dec. 29, 2005

Related U.S. Application Data

(60) Provisional application No. 60/580,153, filed on Jun. 15, 2004.

(51) Int. Cl.
*H04N 7/16* (2006.01)
(52) U.S. Cl. .................. 725/14; 725/131; 725/139; 725/151
(58) Field of Classification Search .............. 725/29, 725/14, 19
See application file for complete search history.

(56) References Cited

U.S. PATENT DOCUMENTS

| 6,256,393 | B1 * | 7/2001 | Safadi et al. ............... 380/232 |
| 6,791,995 | B1 * | 9/2004 | Azenkot et al. ............. 370/436 |
| 2002/0124193 | A1 | 9/2002 | Colman |
| 2003/0189666 | A1 | 10/2003 | Dabell et al. |
| 2003/0237089 | A1 | 12/2003 | Wajs |
| 2004/0114912 | A1 * | 6/2004 | Okamoto et al. ............. 386/114 |
| 2006/0064201 | A1 * | 3/2006 | Chirnomas ................. 700/242 |

OTHER PUBLICATIONS

ITU-T Rec. J.83:1997, Digital multi-programme systems for television, sound and data services for cable distribution. Geneva: International Telecommunication Union, Apr. 1997.
ISO/IEC 13818-1:2000, Information Technology—Coding of moving pictures and associated audio—Part 1: Systems. Geneva: International Organization for Standardization/International Electrotechnical Commission, Dec. 2000.
B.P. Lathi, Signals, System and Controls. New York: Harper & Row, 1974, pp. 207-214 & pp. 428-456.

(Continued)

*Primary Examiner*—Joseph P Hirl
*Assistant Examiner*—Fred Peng
(74) *Attorney, Agent, or Firm*—Miller Patent Services; Jerry A. Miller

(57) ABSTRACT

A method of auditing operation of a cable television appliance consistent with certain embodiments involves detecting an event that triggers an audit; generating a fingerprint value, wherein the fingerprint value is function of the cable television network characteristics at an authorized installation location; comparing the fingerprint value with a stored reference value; if the fingerprint value is within specified limits of the stored reference value, permitting the cable television appliance to carry out a normal operational function; and if the fingerprint value is outside of specified limits of the stored reference value, inhibiting the cable television appliance from carrying out a normal operational function. This abstract is not to be considered limiting, since other embodiments may deviate from the features described in this abstract.

29 Claims, 6 Drawing Sheets

OTHER PUBLICATIONS

A. Bruce Carlson, Communication Systems, 3$^{rd}$ ed. New York: Mc Graw-Hill, 1986, pp. 514-517 & pp. 550-554.
Edward A. Lee and David G. Messerschmitt, Digital Communication, 2$^{nd}$ ed. Boston: Kluwer Academic, 1994, pp. 442-550.
Richard E. Blahut, Digital Transmission of Information. New York: Addison-Welsley, 1990, pp. 159-170.
International Search Report and Written Opinion, PCT/US05/17037, Apr. 10, 2007.

* cited by examiner

LOCATION DETECTOR FOR DIGITAL CABLE TELEVISION APPLIANCES

CROSS REFERENCE TO RELATED DOCUMENTS

This application claims priority benefit of U.S. Provisional patent application No. 60/580,153, Filed Jun. 15, 2004 to Pedlow, Jr., et al. which is hereby incorporated herein by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Digital cable television appliances are becoming mainstream devices in the modern home. These devices may be stand-alone "set top boxes" that are either leased from the cable operator or purchased by the consumer through retail channels. The device may also be integrated directly into new television receivers as part of the "plug and play" initiative for digital television, for example as mandated by the U.S. FCC (Federal Communications Commission).

As the cost of implementing digital decoding capabilities in consumer products rapidly declines and the prevalence of digital programming on cable television systems grows, the cable industry is executing plans for removal of all remaining analog television services from their systems to reclaim spectrum, reduce operational costs and reduce signal theft. The result, for the foreseeable future, will be that cable operators must supply their customers having legacy analog televisions, VCRs, etc. with digital converters that convert the digital signals to analog signals used by these legacy devices in order for these devices to continue operation in an all-digital network.

Industry estimates at this writing indicate that there may be four or more legacy analog devices attached to the cable system in a typical household in addition to any existing digital cable converter or CableCARD™ enabled products. Because of the sheer volume of digital converters that the cable operators will need to deploy to support all of the analog devices presently in their subscribers' homes, and the fact that these devices cannot presently utilize electronic program guides, video-on-demand or pay-per-view services, cable operators have no method to recover the huge capital outlay on the advanced, two-way digital cable boxes they currently have available to deploy. As a result, their attention is now focusing upon very inexpensive, one-way digital converters for this purpose, providing current analog subscribers like-for-like digital service at a significantly lower cost to the operator than replacing analog devices with presently available two-way devices. Many cable operators, for regulatory and other reasons, intend to provide these one-way converters at no cost to their subscribers and believe that the cost of providing these devices can be more than offset through the recovery of valuable spectrum, reduction of operational costs—i.e. "truck rolls" (service calls) for connect/disconnect and elimination of signal theft.

These simple digital converters are generally intended only for the most basic service tiers, ones that are presently delivered in analog form and therefore left unprotected against unauthorized reception, unlike the current premium services, which employ modern digital encryption. A conservative estimate is that as many as one third of the channels carried in modern cable systems are presently still analog basic services and national research indicates that roughly 11.5 million U.S. households steal these cable services each year at a cost of $6.5 billion in lost revenue annually (see Cox Communications Press Release Cox Communications Joins Nationwide Signal Theft Awareness Week June 1-5, BUSINESS WIRE, May 21, 2004).

The transition of the basic tiers from analog services to exclusively digital services having encryption applied will eliminate most of the present forms of signal theft that occur because these new digital converters will be individually addressable by the cable operator. Unlike today, merely having physical access to the cable signal either through unauthorized connection by tampering or because there hasn't been a costly dispatch of field personnel to the premises to implement a disconnect will no longer suffice for present analog customers to receive services for which the cable operator is not compensated. This also applies to new digital television receivers if the owner has not obtained a CableCARD™ from the cable operator and had it electronically authorized for service.

A typical conversion scenario for the all-digital transition would be for a cable operator to upgrade a headend serving a community or city to carry basic tier content in digital form in addition to the analog format presently carried. Next, all current two-way devices deployed for decoding premium digital services are reprogrammed to receive only digital content, including the new digital replacements for the analog tier, instead of the present mixed formats. In parallel, the operator will begin distribution of the new one-way converters to existing subscribers based upon the number of cable outlets in the home that are reported by the subscriber as connected to a legacy analog device (Video Cassette Recorder, television, etc.). There is no way for the cable operator to determine externally the analog device count without either surveying the subscribers or performing a physical audit. The operator will likely deploy these new converter devices en-masse to subscribers as each node of served by a cable headend is converted from mixed analog/digital to all digital through the removal of analog services. A node typically serves from 500 to 2000 customers and the converters must be available to subscribers prior to cutover to avoid service interruption.

While the introduction of all-digital services and low cost digital converters would seem to address all the issues of unauthorized viewing and signal theft, because the low cost converters are only one-way devices, a new opportunity to deprive cable operators of fair payment for service emerges. When subscribers are contacted to determine the quantity of converters necessary for supporting the analog appliances in the home, the subscriber may intentionally "over-report" the quantity of analog appliances in the home. They can later provide the converters received from the cable operator to friends, family, etc. to "split the costs" of basic cable service. There are other models where one-way converters can be redistributed without the knowledge or authorization of the cable operator. Since these devices are assigned by the operator to a valid subscriber, they remain authorized and the cable operator is deprived of subscription revenue because the devices are present in locations other than the home of record for the authorized subscriber.

Other one-way devices that attach to the cable network also suffer from the same issue. The new CableCARD™ device for digital televisions is an example of such a device that suffers the same vulnerability to unauthorized redirection. Two-way devices, such as existing digital cable decoders for premium services, are less likely to suffer from this issue because there are ways to detect electronically the location of these devices through headend interrogation and response with the time delay to respond being measured to determine the cable distance to the device. In such an application, the response time values for two devices assigned to the same address can be compared for similarity and physical proximity inferred.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
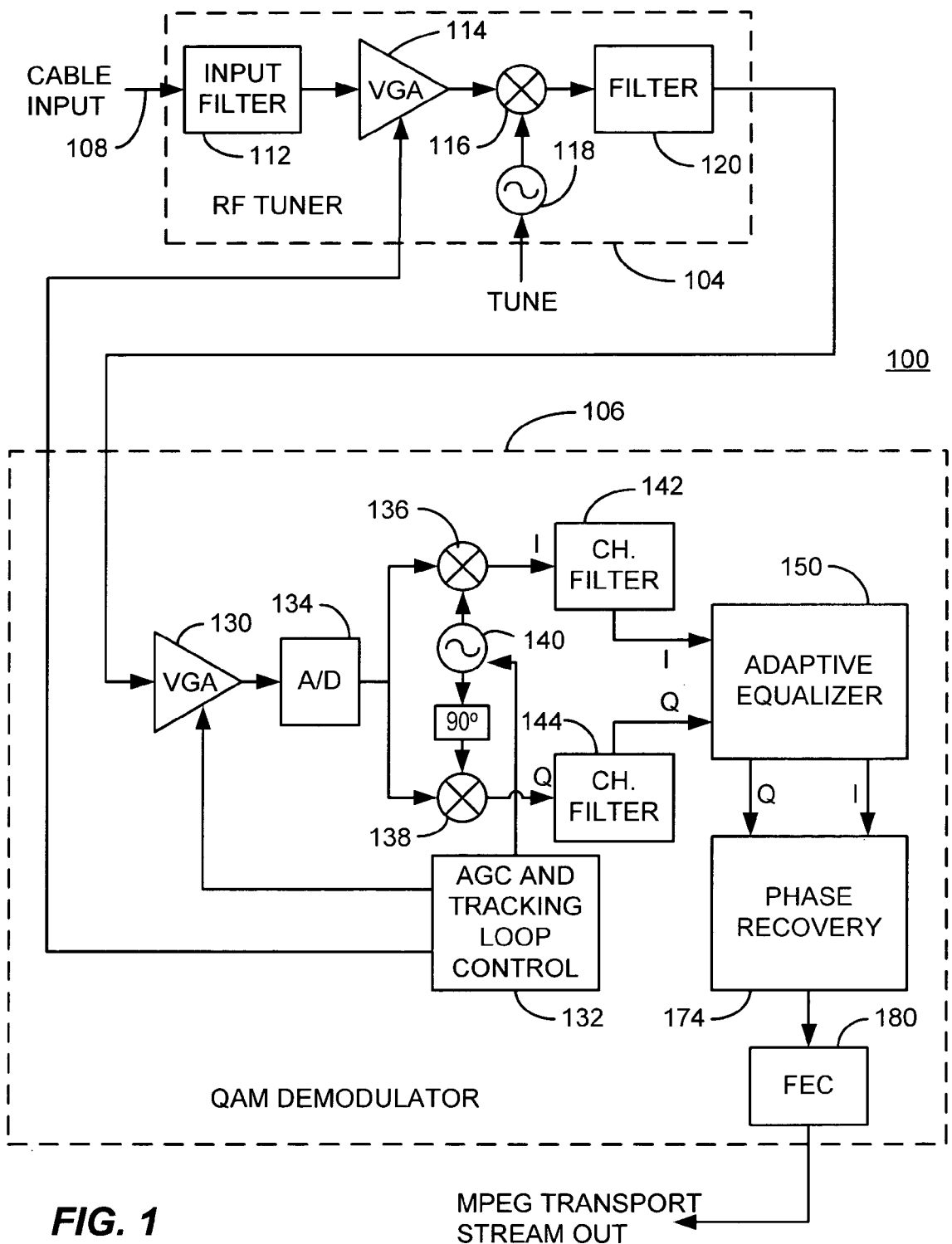
FIG. 1 is a block diagram of an exemplary cable network interface consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

This document describes exemplary embodiments of a robust method and apparatus to self-detect the unauthorized relocation of a one-way (receive only) digital cable television appliance such as a digital converter set-top box. However, it should be noted that the technology described herein is not limited to one-way devices, since it can also be applied advantageously to two-way devices. Thus, the description to follow, while described in terms of a one-way device is not to be considered limited to such devices. The exemplary embodiments presented have high resolution, yet generally require no additional hardware to be added to the product in which it is implemented. Implementation of the concept uses resources already present in all digital cable devices. Also described in detail is how the method can be applied in operation. A system for automated management is presented wherein subscribers could self-activate attached devices without need for operator intervention under normal circumstances.

Regardless of the end use of a particular device, all appliances attached to the digital cable network share a great deal of similarity in their front-end topology. While minor variations may exist, the topology depicted in FIG. 1 in block diagram form as front end 100 is generally a good representation of the front end topology of such devices. The elements that make up the network interface are available from a number of different manufacturers and may be offered in somewhat different configurations featuring flexibility, integration with other elements, support of multiple interfaces, etc. to serve as the differentiation between products.

The cable network interface 100 of FIG. 1 has two major sub-elements, the RF tuner 104 and the Quadrature Amplitude Modulation (QAM) demodulator 106. Minor variations may exist in the modularity and functional elements of these major sub-elements. The function of the Radio Frequency (RF) tuner 104 is to receive all signals on the digital cable system at its cable input and to exclude all but one desired RF channel, containing the digital service of interest at its output 110. An input filter 112 filters the input from the cable system to eliminate noise and interfering signals. A low noise Variable Gain Amplifier (VGA) 114 boosts the signal from the filter 112 to apply the signal to mixer 116. The mixer 116 mixes the output of the amplifier 114 with a tunable oscillator signal from local oscillator 118. This process downconverts the entire block of incoming signals to a lower intermediate frequency (IF), with the signal of interest centered on a fixed, constant value. The output of the mixer 116 is filtered by IF filter 120 and provided to the QAM demodulator 106. The QAM 106 demodulator processes the tuner's IF output 110, converting it to an error free digital stream of, for example MPEG (Moving Pictures Expert Group), transport data, carrying the compressed audio and video services.

Inside the RF tuner the local oscillator 118, controlled by a host processor (not shown), varies in frequency such that the nonlinear combination of the local oscillator signal from 118 and the incoming spectrum from the cable network inside the mixer 116 results in the signal of interest emerging from the mixer 116 centered at the fixed, lower Intermediate Frequency (IF). The IF might be selected to be a value such as 44 MHz.

The input filter 112 eliminates extraneous signals outside the range of valid cable audio/video services (54 MHz to 863

MHz) and the variable gain amplifier (VGA) 114 is automatically adjusted at 132 so that the RF signals passing through the tuner and demodulator remain at optimum levels at all times. The final stage of the RF tuner is an output filter 120, such as for example a surface acoustic wave (SAW) filter 120, which is an electromechanical device designed to only let a small band of signals centered at the IF value pass through and all other RF energy to be heavily attenuated. The SAW filter 120 only passes a standard 6 MHz wide channel and effectively rejects all others. The signal that emerges from the tuner therefore is the channel carrying the service of interest and it has been downconverted to a fixed, standard (IF) frequency for processing by the QAM demodulator 106.

The QAM demodulator 106 receives the incoming 6 MHz wide signal at the intermediate frequency, for example 44 MHz, and again amplifies it to a constant and optimum level through a second variable gain amplifier 130. The gain of VGA 130, as well as VGA 114, is automatically adjusted by one or more closed Automatic Gain Control (AGC) control loops within the QAM demodulator 106. The signal is then processed by an Analog to Digital Converter (A/D or ADC) 134, which converts the incoming stream of time-varying voltages to a serial stream of binary bits representing the voltages of the signal at discrete time intervals. The ADC 134 generally has 10 or more bits of resolution.

The digital stream from A/D 134 is then split into two components, the in-phase component (I) and the out-of-phase component (O). The Q term is used because the signal is in quadrature with respect to the I signal, meaning it is shifted 90° in phase. Phase separation occurs simultaneously with down conversion to a baseband signal, where the lowest frequency is 0 Hz (DC) and highest frequency 6 MHz. This is in contrast to the incoming 44 MHz IF signal, which has its content symmetrically centered ±3 MHz about the IF signal. The downconversion is accomplished through the use of a balanced mixer (mixers 136 and 138) and the I-Q separation occurs because one of the two halves of the balanced mixer has a signal generated by local oscillator 140 that is shifted 90° in phase relative to the signal applied to the other half of the balanced mixer. The outputs of the balanced mixer, I & Q, are then passed through identical channel filters 142 and 144 that provide the appropriate shaping and attenuation of undesired processing artifacts occurring above the 6 MHz passband.

Next, an adaptive equalizer 150 is applied to the outputs of the channel filters 142 and 144. The adaptive equalizer 150 is an automatically self-varying digital filter network that continuously alters its filter characteristic (shape). Its purpose is to compensate automatically for echoes, reflections, dispersion, tilt, intersymbol interference and other distortions that alter the signal from its ideal, original form. Consider, for example, a signal having a transmitted spectrum 154 as shown in FIG. 2A. As this signal is carried by the cable operator's hybrid fiber-coax distribution network to the receiving device various anomalies are introduced that may cause the spectrum to appear at the input of the receiver front end 100 as having the spectrum 156 shown in FIG. 2B. By approaching the ideal of a matched filter, distorted waveforms can be recovered and the error rates for transmitted data reaching the phase recovery element (derotator) significantly reduced. Thus, the job of the adaptive equalizer is to reconstruct the input signal so that its spectrum more closely approximates that of FIG. 2A, such as the spectrum 158 of FIG. 2C. This allows the system to operate successfully under non-ideal conditions, which are typical of real world applications.

Figure 3:
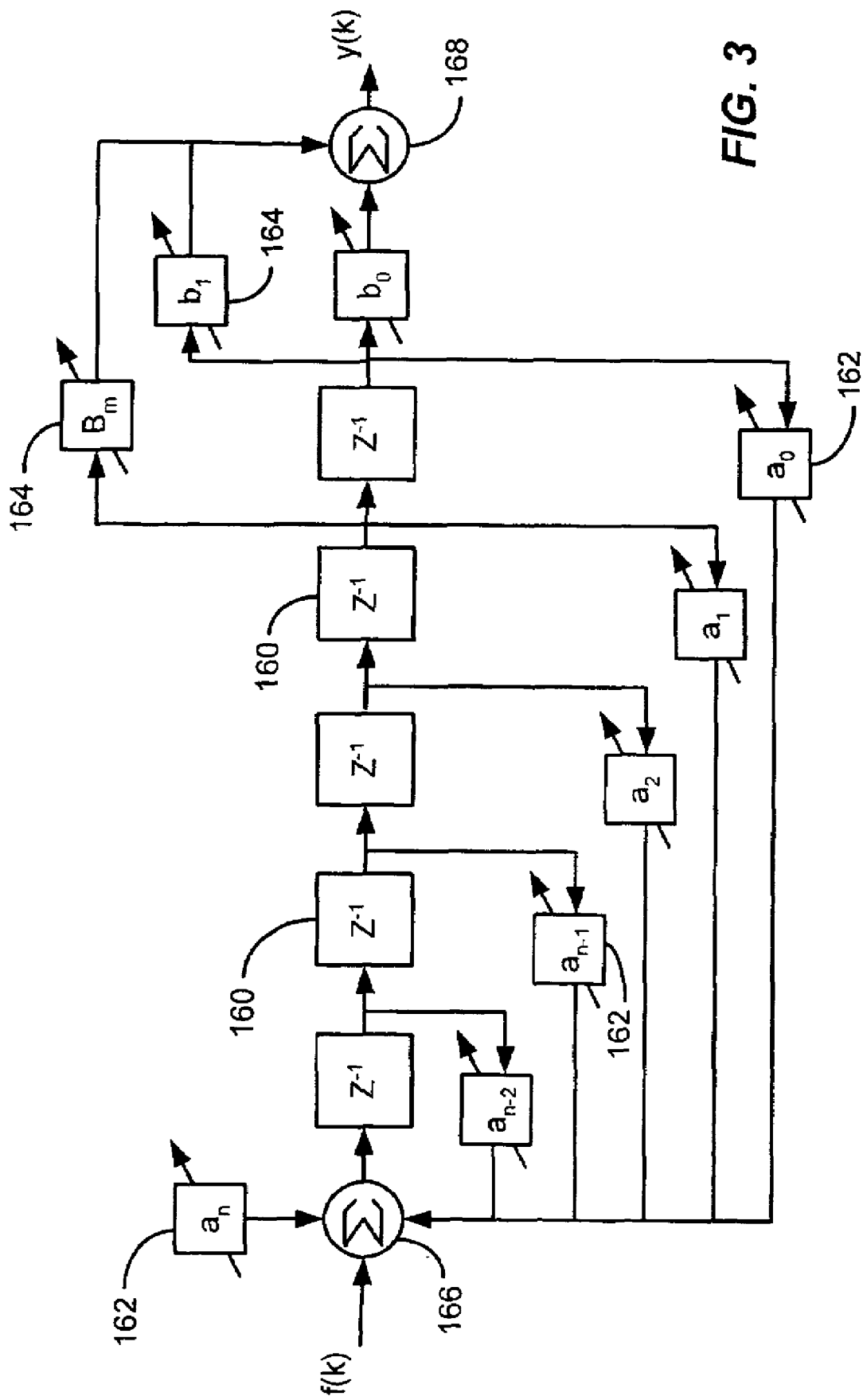
FIG. 3 is a block diagram of an exemplary equalizer consistent with certain embodiments of the present invention.

The details of how the adaptive equalizer 150 is realized differ between different QAM demodulator manufacturers. The general architecture is common between them and takes the form of a classic feed forward/feedback digital filter. A typical digital filter 150 for such a purpose is shown in FIG. 3.

The filter has a cascaded chain of delay stages ($Z^{-1}$) 160 where the discrete time samples of the voltages seen at the demodulator input, converted to binary digital form by the ADC are successively stored when applied to the input as signal sequence f(k). The output of each delay stage tap, in addition to feeding the next cascade, may be fed back to the input or fed forward to the output. The tap feedback may be may be in conjunction with feed forward and either path may be employed exclusively on a tap-by-tap basis. Each feedback or feed forward path has associated with it an independent coefficient term $a_0$ through $a_n$ such as 162 for the feedback tap values and 164 for the feed forward tap values $b_0$ through $b_n$. These tap values may provide amplification or attenuation of the tap output, depending upon the value of the coefficient which acts as a multiplier. The delayed values as modified by the feedback coefficients are added back into the signal chain at 166 and similarly, the values modified by the feed forward factors are added back into the signal chain at 168 to produce the output signal y(k).

Because the equalizer 150 is adaptive, the coefficients dynamically change under the control of a microprocessor, controller or state machine. The values are varied based upon the characteristics of the equalizer output, as seen by the next processing stage, phase recovery. Adaptive equalizers in QAM demodulators vary in implementation between manufacturers. One design, for example, may have a total of 22 taps, where another may have a total of 40 taps—16 feed forward and 24 feedback. Many variations are possible without departing from embodiments consistent with the present invention.

The output of the adaptive equalizer 150 is then processed by the phase recovery block 174, also known as a detector or derotator. The purpose of the detector 174 is to decode the combination of I and Q signals into a single data stream. The detector is able to expand the incoming data streams by a factor of $\log_2$(Modulation Order). This expansion is a factor of 6 for 64-QAM and 8 for 256-QAM, the two typical forms transmitted in digital cable. This expansion is the reason high transport data rates can be efficiently carried in relatively low spectrum bandwidths that seem to violate the Nyquist criterion. The coefficient values 162 and 164 of the adaptive equalizer 150 and the frequency setting of the QAM modulator local oscillator are both controlled by a microprocessor or state machine based upon the success of the detector to "lock" i.e. to recover valid data.

The last processing stage, the forward error corrector (FEC) 180, applies any one or more of a variety of algorithms to the raw recovered digital cable data stream to reduce the likelihood that any of the data has been corrupted with errors in addition to formatting it appropriately for recovery of video and audio services as an MPEG transport stream. It is in this stage that Viterbi (trellis) decoding, de-randomization, Reed-Solomon error correction and MPEG formatting (or other digital formatting) may occur. Some overhead data unique to the operation of these stages are removed from the stream so that the final MPEG transport emerging from the demodulator is identical in form, content and data rate to what the cable operator inserted into the corresponding QAM modulator at the headend for transmission.

Further processing is done to decrypt, demultiplex, decompress and convert the content to a form suitable for display on a television. These functions, while vital to the proper function of the system, are out of context for this document and are conventionally carried out in later functional modules.

In accordance with certain embodiments consistent with the present invention, the ability to detect changes in location of a digital cable receiving device is based in part upon the adaptive equalizer. The equalizer, as indicated, acts as a matched filter to the communications channel. As a result, the values contained within the equalizer's coefficients can be mathematically manipulated to show the transfer function of the communications channel that influences signals passing through it. Stated differently, the values of the coefficients, taken as a set (e.g. a set of forty or so coefficient values or a subset or superset thereof), represent at a specific point in time the sum total knowledge of all mismatches, reflections, phase variations, gain variations, echoes and other perturbations of the transmission media upon the transmitted signal. The fact that the QAM demodulator is able to achieve and maintain signal lock under a given environment validates that the state of the equalizer at that time is such that it accurately reflects the knowledge of the plant's effect upon the system so it can negate those effects and lock successfully. The tolerance to a suboptimal equalizer configuration is low, given the small vector error radii for either QAM-64 or QAM-256 formats used in digital cable. The vector error radius is the composite of effects due to both amplitude and phase errors upon a received signal.

Since the filter coefficient set is directly representative of the transmission environment, it responds dynamically to any changes in that environment. Generally speaking, the low order feedback taps are most often and most significantly affected by high frequency trends, such as impedance variations at the connection or connector on the back of the appliance, reflections within the cable from the house splitter(s), etc. The middle taps are more predominantly affected by variations in the characteristics of the cabling to the tap and distribution amplifier, while the highest order taps are generally most sensitive to channel tilt, dispersion, etc. This data, when combined with the AGC information which indicates total gain required for a constant signal level input, and any other such parameters, provide the basis for a very characteristic fingerprint of the environment where a specific cable appliance is installed.

Tests have indicated that the equalizer is so sensitive to such changes that one can distinguish the cables coming from different ports of an RF splitter to a bank of attached digital cable appliances fed by a single common source. In an experimental case, the devices were all within one meter of each other and had identical cable lengths, yet the values observed for each device were unique and over time were relatively invariant.

If we let an equalizer coefficient be represented by $a \pm jb$, then $H_1$, the matrix of all equalizer coefficients representing the state of the system at one point in time can be represented by:

$$H_1 = \begin{bmatrix} a_0 & b_0 \\ a_1 & b_1 \\ ... & ... \\ a_n & b_m \end{bmatrix}$$

where n is the number of feedback coefficients and m is the number of feed forward coefficients.

Likewise, if we let the gain value of one of the multiple AGC loops be represented by k, then $H_2$, the matrix of all AGC coefficients representing the state of the system at one point in time can be represented by:

$$H_2 = \begin{bmatrix} k_0 \\ k_1 \\ ... \\ k_l \end{bmatrix}$$

where l is the number of AGC coefficients.

If one were to capture the equalizer tap coefficients and AGC data from a digital cable appliance, applying a thresholding function based upon expected the statistical variance and then an algorithm to allow a weighted summation of the coefficients to a single scalar, a unary value representing the unique "fingerprint" of the environment of the device could be expressed. The threshold and weighting functions could be made unique to a particular operator and are secret to reduce the likelihood of tampering.

The algorithm for these operations then looks like:

Fingerprint$(t)=F(t)=Y(H_1,H_2)$.

In one simple example, the fingerprint value can be, for example:

$$F(t) = \sum_0^n a_n x_n + \sum_0^m b_m y_m + \sum_0^l k_l z_l$$

where the reference to t (time) is indicative that, although relatively time invariant, the various coefficients can in fact vary with time. In this simple example, all feedback coefficients are multiplied by a first set of constants ($x_n$), all feed forward coefficients are multiplied by a second set of constants ($y_m$) and all AGC coefficients are multiplied by a third set of constants ($z_l$).

This fingerprint value is gathered, evaluated and stored in the digital cable appliance memory upon receipt of a command message, such as an EMM from the cable operator. The stored value represents a set of cable television network characteristics at a particular installation and should preferably be secured through encryption and signed to detect tampering.

In certain other embodiments, the fingerprint value Y can be a matrix or set of values (rather than a single value) containing all or part of the values of the equalizer coefficients and all gain values, however, this should not be considered limiting, since other algorithms can also be defined. For example, by adjusting the coefficients so that some of them equal zero, a subset of the equalizer coefficients and some all or none of the gain values could be used. Additional characteristic data can also be used. Similarly, these functions can be mathematically combined as discussed above to produce a more compact fingerprint if desired.

Figure 4:
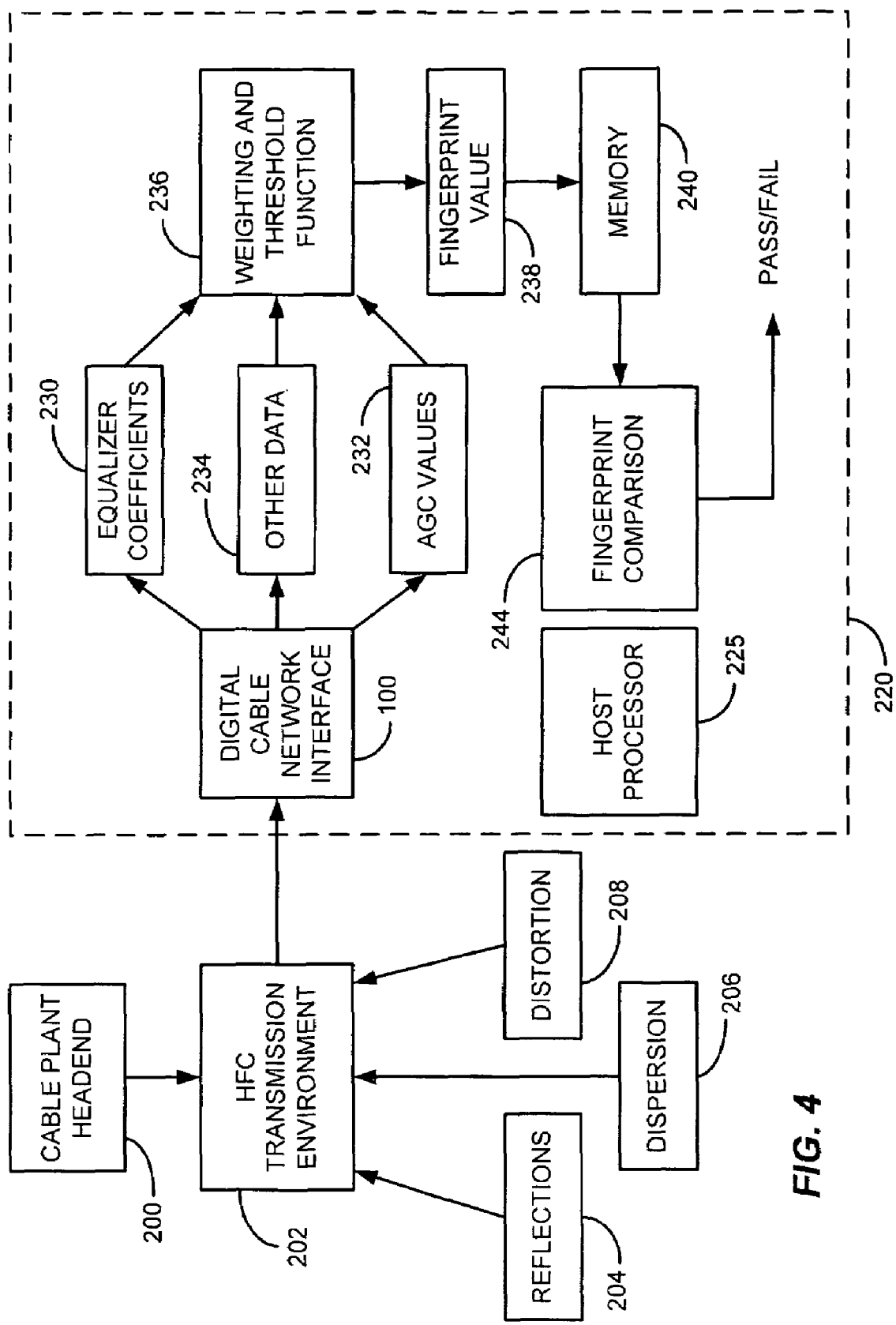
FIG. 4 is a block diagram of a cable network consistent with certain embodiments of the present invention.

FIG. 4 depicts an exemplary cable environment for a network device utilizing certain embodiments consistent with the present invention. In this system, the television signal originates at the cable plant headend 200. The signal passes through the high frequency cable transmission environment 202 (e.g., a hybrid fiber-coax—HFC—system) where various reflections 204, dispersions 206 and distortions 208 and other factors are introduced into the transmitted signal to corrupt the transmitted signal prior to delivery to the network device 220 at the digital cable network interface 100 as previously described. The network device 220 incorporates a host processor 225 such as a microprocessor that operates according to a stored set of programmed steps to carry out the functions described hereafter as well as conventional functions of such a host processor.

In order to carry out a fingerprinting operation consistent with certain embodiments, equalizer coefficients 230, possibly along with AGC gain values 232 and possibly other data 234, are applied to a weighting and threshold function 236 to produce a fingerprint value or collection of values at 238. This value (or these values) is stored in memory 240 and is used for comparison with future or previous fingerprint values in a fingerprint comparison function 244 in accordance with various embodiments that can be devised.

Thus, a self auditing cable television appliance has a mechanism for detecting an event that triggers an audit. A fingerprint value is generated, wherein the fingerprint value is function of the cable television network characteristics at an authorized installation location. A memory stores a reference value. A processor compares the fingerprint value with the stored reference value, wherein: if the fingerprint value is within specified limits of the stored reference value, the cable television appliance carries out a normal operational function; and if the fingerprint value is outside of specified limits of the stored reference value, means for inhibiting the cable television appliance from carrying out a normal operational function.

Figure 5:
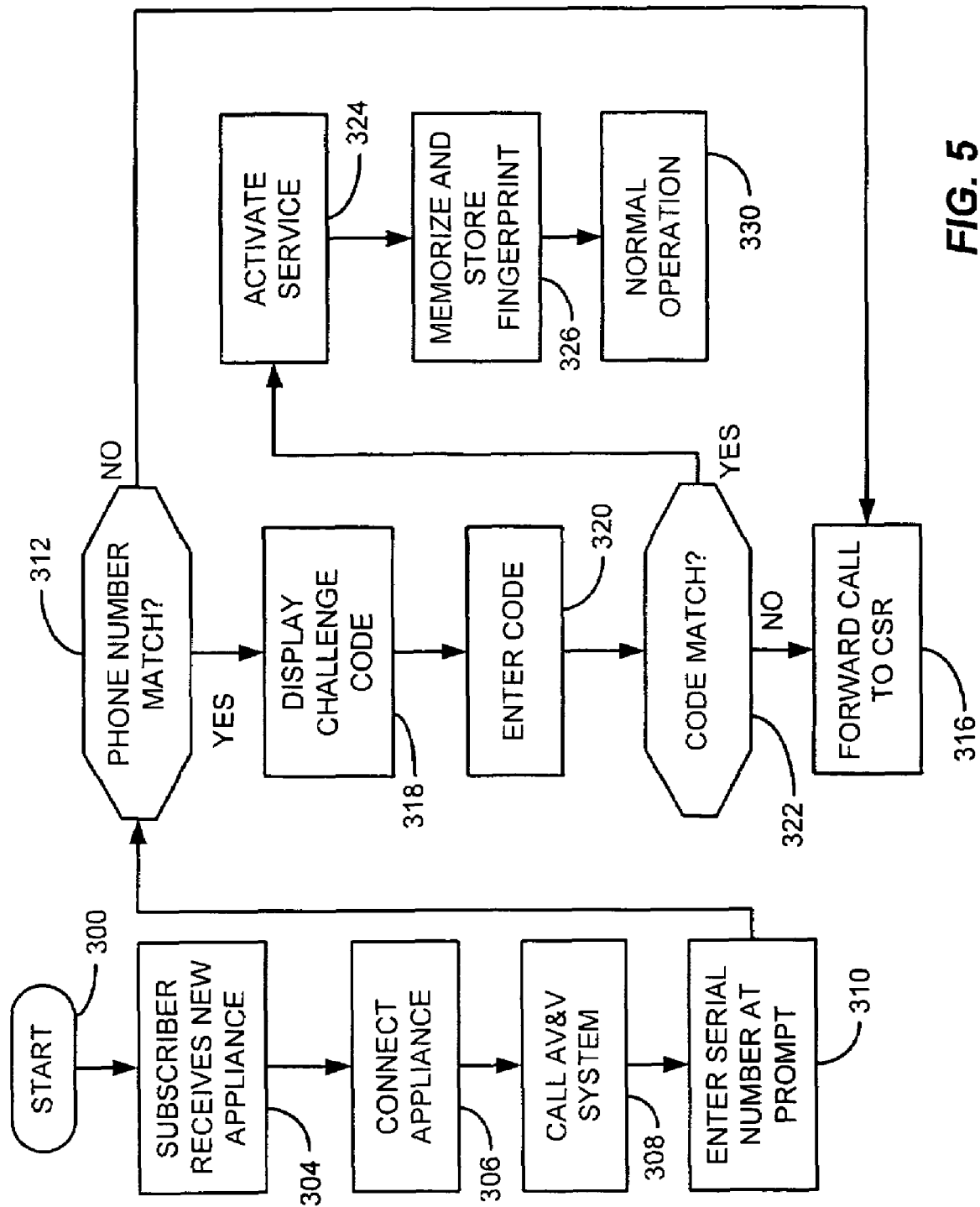
FIG. 5 is a flow chart of an exemplary activation process consistent with certain embodiments of the present invention.
Figure 6:
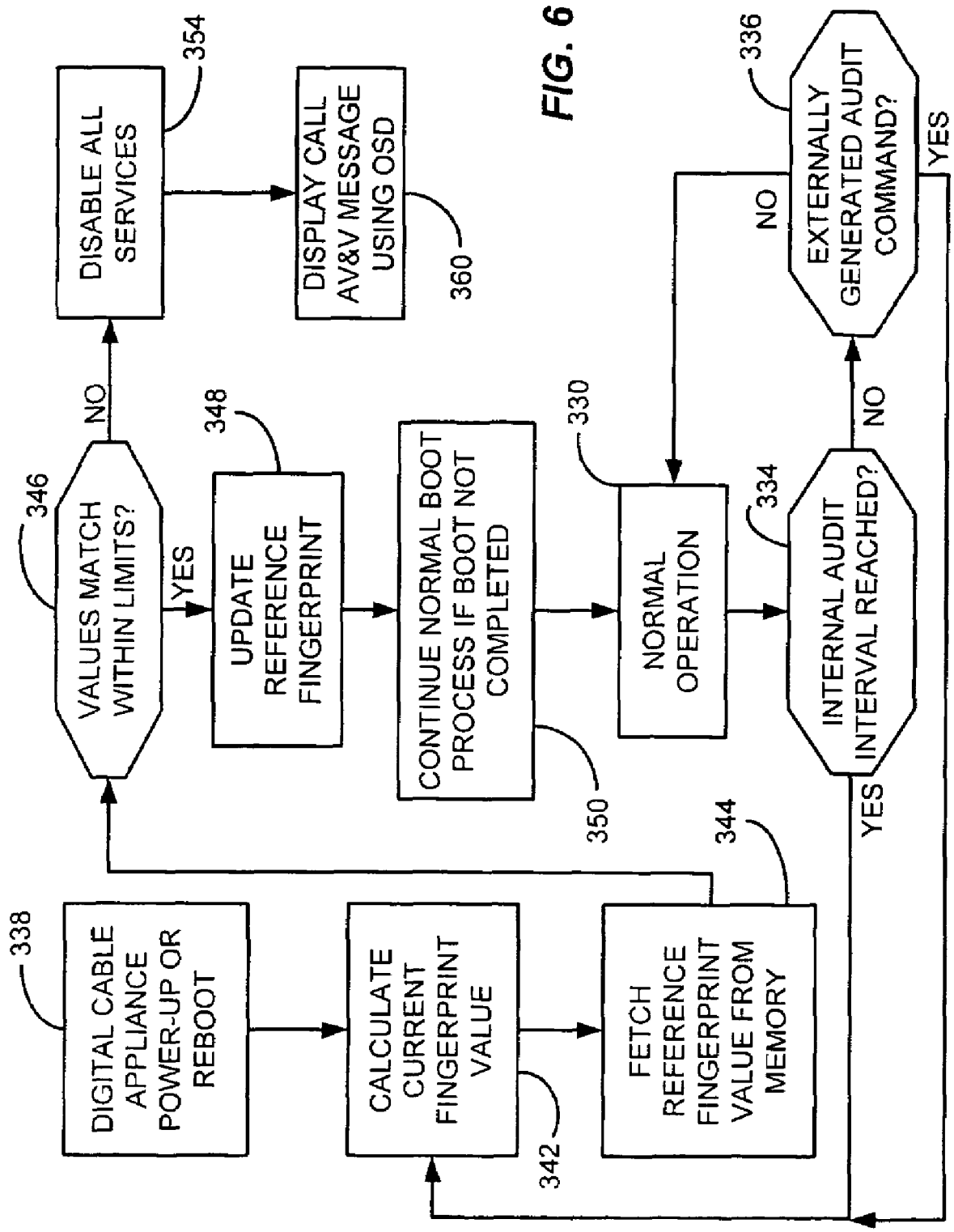
FIG. 6 is a flow chart of an exemplary fingerprint matching process consistent with certain embodiments of the present invention.

One exemplary, but non-limiting, practical embodiment of a system and method employing RF fingerprinting is depicted in FIG. 5 and FIG. 6 as follows:

Starting at 300, a subscriber receives a fingerprint system equipped appliance from the cable operator at 304. The product contains labeling indicating "Call XXX-XXX-XXXX from your home phone after connecting the device to both the cable network and television for activation". Such labeling could, in certain embodiments, be in the form of an on-screen display that is shown at the time of first operation of the appliance. This can be identical in concept to one of the processes followed for activation of home satellite television receivers and credit or Automated Teller Machine (ATM) cards issued through mail by the major financial institutions.

The subscriber follows the instructions connects the appliance at 306 and calls the number on the appliance label after installation at 308, as indicated. An automated validation and verification (AV&V) system at the cable operator receives the call and prompts the subscriber to enter the serial number of the cable appliance at 310 using the keypad on the telephone and may ask the subscriber to press the "#" key upon completion.

Upon receiving the "#" key input or upon other indication that the data entry is complete, the AV&V system confirms the validity of the entered appliance serial number. The system then looks through its subscriber database and finds the record for the subscriber issued the appliance with the entered serial number. It then reads the subscriber's home phone number from the database record. Using ANI, a non-maskable form of caller identification used for calls to toll-free telephone numbers (and 911 calls), the AV&V system then compares the phone numbers at 312 confirms a match between the incoming call and the number of record. If there is no match, the AV&V system refers the call to a customer service representative (CSR) at 316 to resolve any problems. This step validates that an authorized subscriber is attempting to activate the appliance issued to them by the cable operator.

If the ANI and phone number of record match at 312, the AV&V system then sends, via the cable network, an Entitlement Management Message (EMM) command to the appliance having the serial number the subscriber entered by phone. This EMM commands the appliance to display, on the subscriber's television screen, a challenge number sequence at 318 contained within the EMM message and generated at random by the AV&V system. The AV&V system then instructs the subscriber to enter into the telephone, the number displayed on the screen using the keypad on the telephone and to press the "#" key upon completion at 320.

Upon receiving the "#" key input, the AV&V system confirms the validity of the entered challenge number at 322 and if unsuccessful at 322, refers the call to a customer service agent at 316. This step validates that the authorized subscriber is attempting to activate the appliance issued to them by the cable operator at the home of record.

If the challenge sequence is successful at 322, the AV&V system sends another EMM to the now validated appliance, commanding it to perform two steps:

Activate the services authorized for that subscriber at 326, and

Calculate the RF fingerprint for the appliance at the present location and store it in persistent memory at 326. Normal operation of the appliance now proceeds at 330.

With reference to FIG. 6, at periodic audit intervals determined at 334, or when an EMM external command is generated at 336 at or by self-initiation, which uses a timer resident in software, or upon any system reboot at 338, the appliance collects data and calculates an electronic fingerprint value, comparing it to the reference value stored in memory. If the calculated value is within predetermined limits, no further action is taken until the next audit period. If the new value for the fingerprint is sufficiently different from the stored reference value, then the reference value in memory is updated with the new reference value.

Consider the situation of a reboot or power-up. Whenever the appliance is rebooted or otherwise reset, signifying a lapse in network connectivity where the appliance may have been relocated without the authorization of the cable operator, the appliance collects data and calculates an electronic fingerprint value at 342. The reference fingerprint is then retrieved from memory at 344 and these values are compared at 346. If the calculated value is within predetermined limits, the new value may be placed in memory at 348 as the updated reference fingerprint. The cable network device continues the booting process (if necessary) at 350 and services are restored with normal operation at 330. If the match is unsuccessful at 346, all television services are automatically self-deauthorized (disabled, turned off or inhibited) at 354 by the appliance itself. That is, the appliance, by whatever means, does not produce television signals as an output thereof. This can be accomplished by any number of mechanisms including hardware and software disabling techniques (bypassing functional algorithms, disabling power, disrupting a signal flow, substitution of values for signal, gain, frequency, flag or coefficient values, parameters, etc.) An on-screen message can then be generated by the appliance at 360 and displayed on the subscriber's television screen indicating that the cable operator must be contacted at the AV&V telephone number contained within the message for appliance reactivation. This message occurs because the appliance has determined that an unauthorized relocation has occurred. When the subscriber calls the displayed telephone number, the AV&V process is started anew and the location of the device is re-evaluated.

As indicated in FIG. 6, once normal operation is attained, a new audit can be initiated either by a new boot of the appliance at 338, or by expiration of a self timed audit interval at 334 (which also serves to keep the value of the fingerprint updated to reflect slowly changing variables of the cable network and attached devices (e.g., aging, and modification of the network infrastructure). Additionally, receipt of an externally generated audit command can trigger a new audit in certain embodiments. Each triggering operation results in control passing to 342 and operation of the process as described.

Thus, in accordance with certain embodiments, a method of auditing operation of a cable television appliance, involves detecting an event that triggers an audit; generating a fingerprint value, wherein the fingerprint value is function of the cable television network characteristics at an authorized installation location; comparing the fingerprint value with a stored reference value; if the fingerprint value is within specified limits of the stored reference value, permitting the cable television appliance to carry out a normal operational function; and if the fingerprint value is outside of specified limits of the stored reference value, inhibiting the cable television appliance from carrying out a normal operational function.

Another method of auditing operation of a cable television appliance consistent with certain embodiments involves detecting an event that triggers an audit (such as reception of a command from 200 to perform the audit); generating a fingerprint value, wherein the fingerprint value is function of the cable television network characteristics at an authorized installation location; wherein the fingerprint value comprises a function of at least one of the following: at least one equalizer coefficient of an adaptive equalizer of the cable television appliance and at least one gain coefficient value of an AGC loop of the cable television appliance; comparing the fingerprint value with a stored reference value; if the fingerprint value is within specified limits of the stored reference value, permitting the cable television appliance to carry out a normal operational function and storing the fingerprint value for use as the stored reference values in a subsequent audit; and if the fingerprint value is outside of specified limits of the stored reference value, inhibiting the cable television appliance from carrying out a normal operational function.

Thus, certain embodiments consistent with the present invention address the issue of detecting unauthorized relocation of equipment (including one-way or two-way equipment) consigned to the subscriber by the cable operator. The method in which it is accomplished uses resources already available in the appliance and adds no additional hardware costs to the product.

Various embodiments are within the scope of the present invention. The APPENDIX to this application, which appears after the claims of this application, forms a part of this specification and provides further description of an embodiment consistent with the present invention. The APPENDIX is an unpublished paper (as of this writing) which was prepared by Leo (Lee) Pedlow, one of the inventors hereof and is entitled "RF FINGERPRINTING: An Operationally Effective Method to Reduce Cable Television Signal and Equipment Theft". This APPENDIX forms an actual part of this specification and is hereby incorporated by reference in its entirety. However, no statements made in this APPENDIX constitute any admission whatsoever of prior art. Additionally, the present invention is not to be considered limited to the embodiments described in this APPENDIX.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

APPENDIX

RF FINGERPRINTING: An operationally effective method to reduce cable television signal and equipment theft
Lee Pedlow
Sony Electronics, Inc.

Abstract

*Presented is a robust method to self-detect the unauthorized relocation of digital cable television appliances, especially one-way or CableCARD-based devices, as a deterrent to signal (service) and MSO-provided equipment theft. The method offered has high resolution, yet requires no additional hardware to be added to the products in which it is implemented. Implementation of the concept uses an innovative application of resources already present in all digital cable compatible devices plus the real-time analysis of characteristic data obtained by the subscriber device through direct observation of its environment.*

*A system for automated device management is also presented wherein subscribers could self-activate attached devices without need for manual intervention by the cable system operator under normal circumstances.*

INTRODUCTION

Digital Cable Appliances

Digital cable television appliances are becoming mainstream devices in the modern home. These devices may be stand-alone "set top boxes" that are either leased from the cable operator or purchased by the consumer through retail channels. Alternatively, the functionality of a digital cable appliance may be integrated directly into new television receivers as part of the "plug and play" initiative for digital television, as mandated by the FCC.

As the cost of implementing digital decoding capabilities in consumer products rapidly declines and the prevalence of digital programming on cable television systems grows, the cable industry is marching toward removal of all remaining analog television services from their systems to reclaim spectrum, reduce operational costs and reduce signal theft.

In the foreseeable future cable operators will need to supply their existing customers having legacy analog televisions, VCRs, etc. large quantities of digital converters in order to maintain continued operation of those analog devices in an all-digital network and as part of the operator's compliance with federal regulations.

Industry estimates indicate that there may be four or more legacy analog devices attached to the cable system in a typical household in addition to existing digital cable converters for premium service access and CableCARD enabled products. Because of the sheer volume of digital converters that the cable operators will need to deploy in support of the analog devices presently in their subscribers' homes and the fact that analog devices connected directly to the cable network do not pay for advanced services such as electronic program guides, video-on-demand or pay-per-view services, cable operators have no method to recover the huge additional capital outlay required for supplying the advanced, two-way digital cable boxes currently available.

As a result, attention is now focusing upon providing very inexpensive, one-way digital converters for this purpose, delivering current analog subscribers like-for-like digital service at a significantly lower cost to the operator than would be encountered using the presently available advanced two-way devices. The cable operators, for regulatory and other reasons, intend to provide these one-way converters at no additional cost to their subscribers and believe that the cost of providing these devices can be more than offset through the recovery of valuable cable spectrum, elimination of signal theft and reduction of operational costs such as truck rolls for service connect/disconnect.

These simple digital converters are intended only for the most basic of service tiers, ones that are presently delivered in analog form and therefore have been left unprotected against unauthorized reception, unlike the current premium services which employ modern digital encryption. A conservative estimate is that more than one third of the channels carried in modern cable systems are presently analog basic services.

A May, 2004 press release from a major cable system operator, Cox Communications, indicates that roughly 11.5 million U.S. households steal these cable services each year at an industry cost of $6.5 billion in lost revenue annually.

The transition of the basic subscription tiers from analog services to exclusively digital services having encryption applied will eliminate most of the present forms of signal theft that occur because these new digital converters will be individually addressable by the cable operator. Unlike today, merely having physical access to the cable signal either through an unauthorized connection by tampering or because there hasn't been a costly dispatch of the cable operator's field personnel to the premises to implement a disconnect will no longer suffice for basic tier customers to receive services for which the cable operator is not compensated. This also applies to new digital television receivers if the owner has not obtained a CableCARD from the cable operator and had it electronically authorized for service.

The typical conversion scenario for the all-digital transition would be for a cable operator to upgrade a headend serving a community or city to carry basic tier content in digital form in addition to the analog format presently carried. Next, all current two-way devices deployed for decoding premium digital services are provisioned with new channel maps, directing them to receive only digital forms of content, including the new digital replacements for the analog tier instead of the present mixed format. In parallel, the operator will begin distribution of the new, low-cost one-way converters to existing subscribers based upon the number of cable outlets in the home that are reported by the subscriber as connected to a legacy analog device (VCR, TV, etc.). There is no way for the cable operator to determine the analog device count in a home without either surveying the subscriber or performing a physical audit inside their premises. The operator will likely deploy these new converter devices en-masse as each node served by a cable headend is converted from mixed analog/digital format to all-digital through the removal of analog services. A network node typically serves from 500 to 2000 customers and the converters must be available to all subscribers in a targeted node prior to cutover in order to avoid service interruption.

While the introduction of all-digital services and low cost digital converters would seem to address all the issues of unauthorized viewing and signal theft, a new opportunity to deprive cable operators of fair payment for service emerges, made even more challenging because these low cost converters are likely only one-way devices,. When subscribers are contacted to determine the quantity of converters necessary for supporting the analog appliances in their home, the subscriber may intentionally "over-report" the quantity of analog appliances in the home. They can later provide the excess converters received from

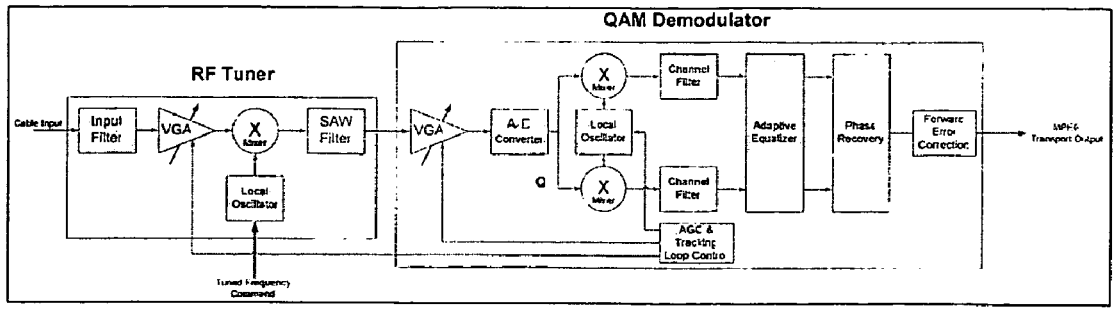

Fig. 1 Generic digital cable network interface the cable operator to friends, family, etc. to "split the costs" of basic cable service. This is but one example of how one-way converters can be redistributed without the knowledge or consent of the cable operator in order to deny the operator of payment.

Since these new devices are issued by the operator to a valid subscriber, they remain authorized, but the cable operator is deprived of the full value of subscription revenue because the devices are present in locations other than the home of record for the authorized subscriber and the operator is therefore not compensated by the additional, unauthorized viewers.

Other one-way devices that attach to the cable network also suffer from the same vulnerability. The new CableCARD device for digital television is an example of such a device that suffers the same susceptibility to unauthorized redirection. Two-way devices, such as existing digital cable decoders for premium services, are less likely to suffer from this issue because there are means to electronically detect the location of these devices through headend interrogation and response, with the time delay to respond being measured to determine the cable distance to the device. In such an application, the response time values for two devices assigned to the same address can be compared for similarity and physical proximity inferred. While such a method provides some protection from unauthorized relocation, it will be shown later that it is an inferior method, suffering from poor resolution and other problems.

Sony's has developed technology to address the issue of detecting unauthorized relocation of one-way equipment consigned to the subscriber by the cable operator. The method in which it is accomplished uses resources already available in the appliance and adds no additional hardware cost to the product.

The Network Interface for Digital Cable

Regardless of the end use of a particular device, all appliances attached to the digital cable network share a common front-end topology. The elements that make up the network interface are available from a number of different manufacturers and may be offered in different configurations featuring flexibility, integration with other elements, support of multiple interfaces, etc. to serve as the differentiation between products.

The typical network interface is shown in Fig. 1. The cable network interface consists of two major sub elements, the RF tuner and the QAM demodulator. The function of the RF tuner is to receive all signals on the digital cable system and to exclude all but one desired RF channel, containing the digital service of interest. The method used to select the desired channel is called heterodyning and this process is used to convert an entire block of incoming signals to a lower intermediate frequency (IF), with the signal of interest centered on a fixed, constant value, which is passed through a fixed, narrow filter to eliminate the unwanted carriers. The QAM demodulator processes the tuner's IF output, converting it to an error free digital stream of MPEG transport data carrying the compressed audio and video services.

Inside the RF tuner the local oscillator, controlled by the host processor, varies in frequency such that the nonlinear combination of the local oscillator signal and the incoming spectrum from the cable network inside the mixer results in the signal of interest emerging from the mixer centered at the fixed, lower intermediate frequency. The IF typically might be selected to be a value such as 44MHz. The input filter eliminates extraneous signals outside the range of valid cable audio/video services (54MHz to 863MHz) and the variable gain amplifier (VGA) is automatically adjusted so that the RF signals passing through the tuner and demodulator remain at optimum levels at all times. The final stage of the RF tuner is the surface acoustic wave (SAW) filter, which is an electromechanical device designed to only let a small band of signals centered at the IF value pass and all other RF energy to be heavily attenuated. The SAW only passes a standard 6 MHz wide channel and effectively rejects all others. The signal that emerges from the tuner is therefore only the channel carrying the service of interest and it has been downconverted to a fixed, standard (IF) frequency for processing by the QAM demodulator.

The QAM demodulator receives the incoming 6 MHz wide signal at the intermediate frequency, typically 44 MHz, and again amplifies it to a constant and optimum level through a second variable gain amplifier. The VGA is automatically adjusted by a closed control loop within the QAM demodulator. The signal is then processed by an analog to digital converter (ADC), which converts the incoming stream of time-varying voltages to a serial stream of binary bits representing the voltage levels of the signal at discrete time intervals. The ADC typically has 10 or more bits of resolution.

The digital stream is then split into two components, the in-phase component (I) and the out-of-phase component (Q). The Q term is used because the signal is in quadrature with respect to the I signal, meaning it is shifted 90° in phase. Phase separation occurs simultaneously with down conversion to a baseband signal, where the lowest frequency is 0Hz (DC) and highest frequency 6 MHz. This is in contrast to the incoming 44MHz IF signal, which has its content symmetrically centered ±3 MHz about the IF signal. The downconversion is accomplished through the use of a balanced mixer and the I-Q separation occurs because one of the two halves of the balanced mixer has a local oscillator signal output that is shifted 90° in phase relative to the signal applied to the other half of the balanced mixer. The outputs of the balanced mixer, I & Q, are then passed through identical channel filters that provide the appropriate shaping and attenuation of undesired processing artifacts occurring above the 6 MHz passband.

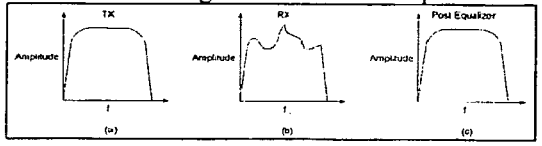

Figure 2:
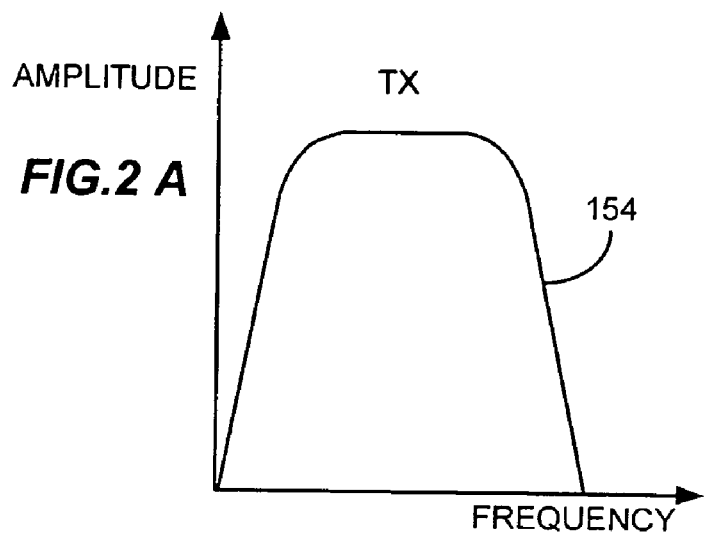
FIG. 2, which is made up of FIGS. 2A, 2B and 2C, are frequency domain graphs depicting equalization in a manner consistent with certain embodiments of the present invention.
Figure 2B:
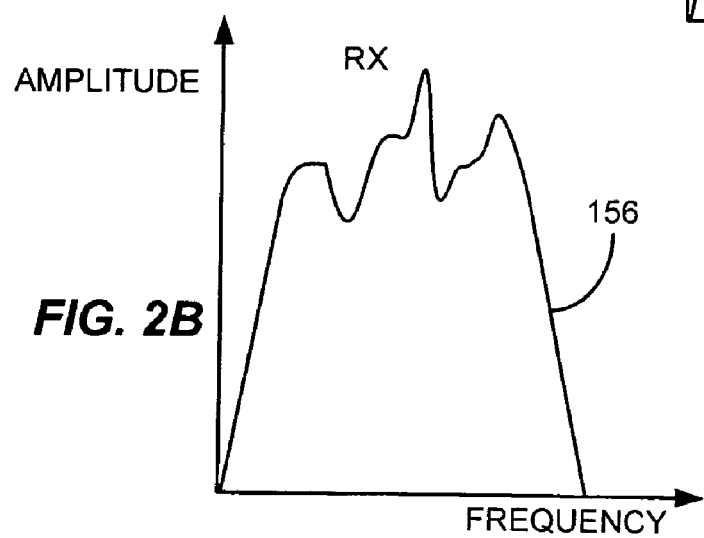
Figure 2:
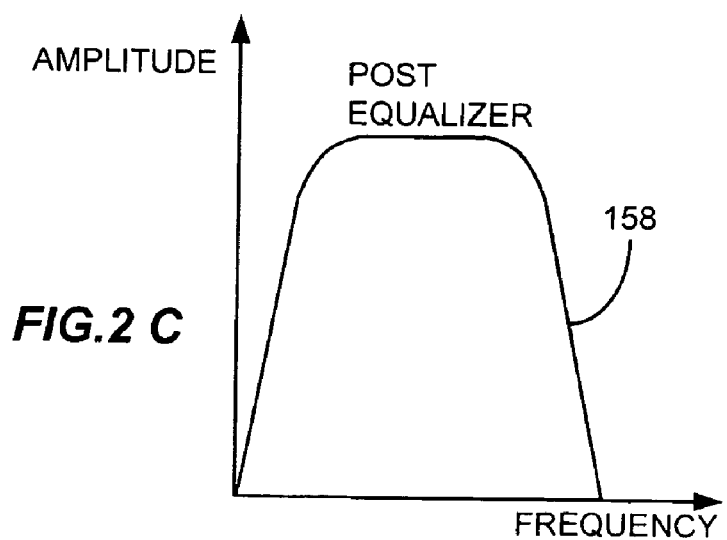

Fig. 2 Digital cable channel spectrum

Next, an adaptive equalizer is applied to the outputs of the channel filters. The adaptive equalizer is an automatically self-varying digital filter network that continuously alters its filter characteristic (shape). Its purpose is to compensate automatically for echoes, reflections, dispersion, tilt, intersymbol interference and other distortions that alter the signal from its ideal, original form (Fig. 2a) as it is carried by the cable operator's hybrid fiber-coax distribution network to the receiving device (Fig. 2b), possibly over very long distances. By approaching the ideal of a matched filter, waveforms distorted through the communication path to the subscriber can be recovered and the data error rates for transmitted data reaching the phase recovery element (derotator) significantly reduced. This allows the system to operate successfully under non-ideal conditions, which are typical of real world applications.

The details of how the adaptive equalizer is realized differ between different QAM demodulator manufacturers. The general architecture is common between them and takes the form of a classic feed forward/feedback digital filter. A typical digital filter for such a purpose is shown in Fig. 3.

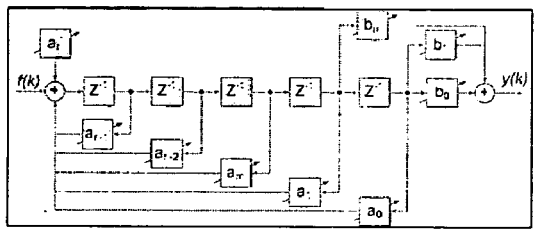

Fig. 3 Adaptive equalizer

The structure of the filter is centered about a cascaded chain of delay stages ($Z^{-1}$), where the discrete time samples of the voltages seen at the demodulator input, converted to binary digital from by the ADC, are successively stored. The output of each delay stage tap, in addition to feeding the next cascade, may be fed back to the input or fed forward to the output. The tap feedback may be may be in conjunction with feed forward and either path may be employed exclusively on a tap-by-tap basis. Each feedback or feed forward path has associated with it an independent coefficient term. This term (a & b blocks in Fig. 2) may provide amplification or attenuation of the tap output, depending upon the value of the coefficient. Because the equalizer is adaptive, the coefficients dynamically change under the control of a microprocessor or state machine. The values are varied based upon the characteristics of the equalizer output, as seen by the next processing stage, phase recovery. Typically a least mean square (LMS) algorithm is used to vary the tap values and converge upon the optimal solution. Adaptive equalizers in QAM demodulators vary in implementation between manufacturers. One design may have a total of 22 taps, where another may have a total of 40 taps – 16 feed forward and 24 feedback.

The output of the adaptive equalizer is then processed by the phase recovery block, also known as a detector or derotator. The purpose of the detector is to decode the combination of I and Q signals into a single data stream. The detector is able to expand the incoming data streams by a factor of log$_2$(Modulation Order). This expansion is a factor of 6 for 64-QAM and 8 for 256-QAM, the two typical forms transmitted in digital cable. This expansion is the reason high transport data rates can be efficiently carried in relatively low spectrum bandwidths that appear to violate the Nyquist criterion. The coefficient values of the adaptive equalizer and the frequency setting of the QAM modulator local oscillator are both controlled by a microprocessor or state machine based upon the success of the detector to "lock" i.e. to recover valid data.

The last processing stage, the forward error corrector (FEC), applies a variety of algorithms to the raw recovered digital cable data stream to reduce the likelihood that any of the data has been corrupted in addition to formatting it appropriately for recovery of video and audio services as an MPEG transport stream. It is in this stage that de-interleaving, Viterbi (trellis) decoding, de-randomization, Reed-Solomon error correction and MPEG formatting occur. Some overhead data unique to the operation of these stages are removed from the stream so that the final MPEG transport emerging from the demodulator is identical in form, content and data rate to what the cable operator

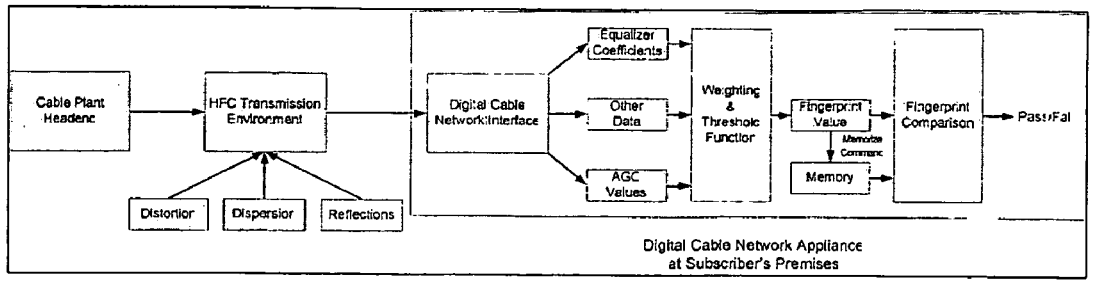

Fig. 4 RF Fingerprint system inserted into the corresponding QAM modulator at the headend for transmission.

Further processing is done to decrypt, demultiplex, decompress and convert the content to a form suitable for display on a television. These steps, while vital to the proper function of a digital cable appliance, are beyond the scope of this document.

SONY'S "RF FINGERPRINT" TECHNOLOGY

The ability to detect changes in location of a one-way digital cable receiving device is based in large part upon the adaptive equalizer. The equalizer, as indicated, acts as a matched filter to the communications channel. As a result, the values contained within the equalizer's coefficients can be mathematically manipulated to show the transfer function of the communications channel that influences signals passing through it. Stated differently, the values of the coefficients, taken as a set, represent at a specific point in time the sum total knowledge of all mismatches, reflections, phase variations, gain variations, echoes and other perturbations of the transmission media upon the transmitted signal. The fact that the QAM demodulator is able to achieve and maintain signal lock under a given environment validates that the state of the equalizer at that time is such that it accurately reflects the knowledge of the plant's effect upon the system so it can negate those effects and lock successfully. The tolerance to a suboptimal equalizer configuration is low, given the small vector error radii for either the QAM-64 or QAM-256 formats used in digital cable. The vector error radius is the composite of effects due to both amplitude and phase distortions upon a received signal.

Since the filter coefficient set is directly representative of the transmission environment, it responds dynamically to any changes in that environment. The low order feedback taps are most affected by high frequency trends, such as impedance variations at the connection or connector on the back of the appliance, reflections within the cable from the house splitter(s), etc. The middle taps are more predominantly affected by variations in the characteristics of the cabling to the tap and distribution amplifier, while the highest order taps are sensitive to channel tilt, dispersion, etc. This data, when combined with the AGC information which indicates total gain required for a constant signal level input, provides the basis for a very characteristic fingerprint of the environment where a specific cable appliance is installed.

Research by Sony indicates that the equalizer is so sensitive to such changes that one can distinguish between the short cables coming from different ports of an RF splitter to a bank of attached digital cable appliances fed by a single common source. In this case, the devices were all within one meter of each other and had identical cable lengths, yet the values observed for each device were unique and over time were relatively invariant.

If we let an equalizer coefficient be represented by $a \pm jb$, then $H_1$, the matrix of all equalizer coefficients representing the state of the system at one point in time, $i$, can be represented by:

$$H_{1,i} = \begin{pmatrix} a_0 & b_0 \\ \vdots & \vdots \\ a_n & b_n \end{pmatrix} \quad (1)$$

Likewise, if we let the gain value of one of the multiple nested AGC loops be represented by k, then $H_2$, the matrix of all AGC coefficients representing the state of the system at one point in time can be represented by:

$$H_{2,i} = \begin{pmatrix} k_0 \\ \vdots \\ k_n \end{pmatrix} \quad (2)$$

If one were to capture the equalizer tap coefficients and AGC data from a digital cable appliance, then applying an algorithm to allow the weighted summation of the coefficients a weighting function, based upon the expected statistical variance, to create a single scalar, a unary value representing the unique "fingerprint" of the environment of the device could be expressed. The threshold and weighting functions could be made unique to a particular operator and are kept secret to reduce the likelihood of tampering.

The algorithm for these operations then looks like:

$$Fingerprint_i = Y(H_{1,i}, H_{2,i}) \quad (3)$$

This fingerprint value is evaluated and stored in the digital cable appliance memory upon receipt of a command message, such as an EMM, from the cable operator. The stored value should be secured through encryption and digitally signed to detect tampering.

The Fingerprint Algorithm

Most of our current research on the RF Fingerprint concept is focused upon refining the algorithm used to calculate the RF Fingerprint, specifically the coefficient values of the weighting matrix, based upon experimental observation of actual cable appliances *in-situ*. The generalized form of the algorithm to calculate the fingerprint value based upon one manufacturer's implementation of QAM demodulator is:

$$Fingerprint = \sum_{i=0}^{39}(Tap_{a,i} \bullet W_{a,i}) + \sum_{i=0}^{39}(Tap_{b,i} \bullet W_{b,i}) + SF \quad (4)$$

Where $W$ represents a value in the weighting coefficient matrix associated with a particular equalizer tap and $SF$ represents the equalizer scale factor that is used to normalize all equalizer tap coefficients.

In order to determine the appropriate values for the weighting coefficients, tools were created by the team to remotely collect equalizer coefficient and other data from digital cable appliances installed throughout the Sony cable test network, an elaborate system serving the entire San Diego corporate campus closely emulating a commercial cable television network. Devices were sampled at three minute intervals and remotely tuned to services on multiple frequencies. The data gathered was subsequently compiled into a large database for further analysis.

One of the first items confirmed was the repeatability of the equalizer configuration for a given subscriber drop and cable device. Repeatability was judged based upon the measurement of the standard deviation over a four day period. Fig. 6 shows the results of one such data collection experiment where two different digital cable devices were attached to the test network for a statistically meaningful period. At the end of that period the two devices exchanged locations and data collection was restarted for the same period. As can be seen in the graph, not only is the data generally quite repeatable for a given device, but the dispersion tracks the location, not the device.

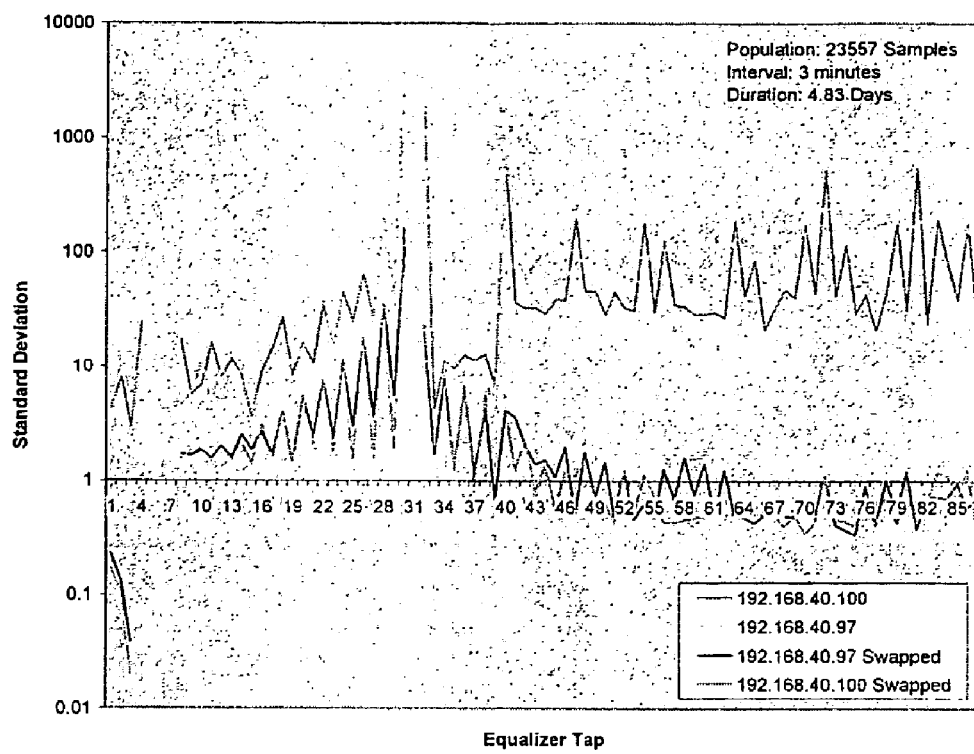
Fig. 5 Positional uniqueness
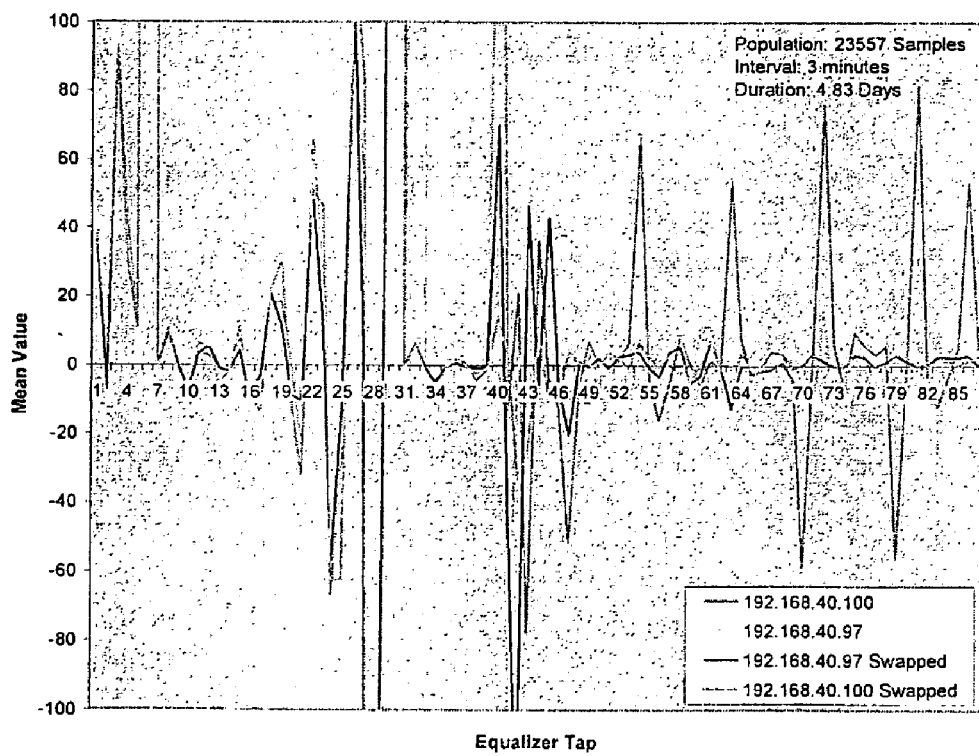
Fig. 6 Equalizer coefficient repeatability

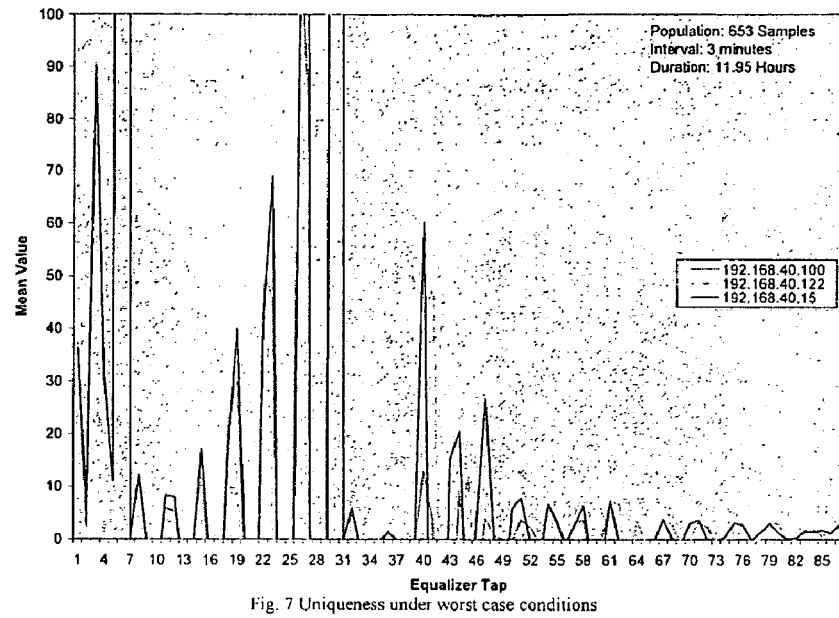

Fig. 7 Uniqueness under worst case conditions

Using the data collected during the same experiment, Fig. 7 shows that each of the four cases (two digital cable devices in two different locations) possesses a unique signature, allowing each to be distinguished from another device/location. The purpose of the weighting matrix is to selectively amplify those equalizer tap and AGC coefficients that express "uniqueness" terms and to attenuate those terms that contribute little in the context of distinguishing devices or tend to be unrepeatable.

In order to evaluate a worst case scenario, three cable appliances were connected through identical one meter long cables to a common splitter fed by the test network. The QAM performance of the three test units were monitored using four discrete frequencies at three minute intervals for a twelve hour period. The results of the investigation are shown in Fig. 5. Confirmed was that even in an apparently identical RF environment and close physical proximity to ensure consistency of other environmental factors, the three different devices were distinguishable based solely upon equalizer and AGC coefficient values.

In practice, an installation having only one meter service drop lengths would seldom be seen and could actually be disregarded by the algorithm comparing fingerprint values to avoid false alarms due to product relocation from room to room within a home. However, it does prove that the concept is robust and applicable to high density dwellings such as apartments and dormitories where even two way methods, such as the one used in DOCSIS, fail. The DOCSIS method, for example, can only resolve location to within 63 meters, much more than the cable length differential between adjacent apartments. This is because DOCSIS and other proposed schemes use time delay measurement as the determining criteria. These other schemes also require some form of two-way communication. The RF fingerprint scheme is immune to issues plaguing methods solely related to cable length and works in a purely unidirectional environment as well as bidirectional environments.

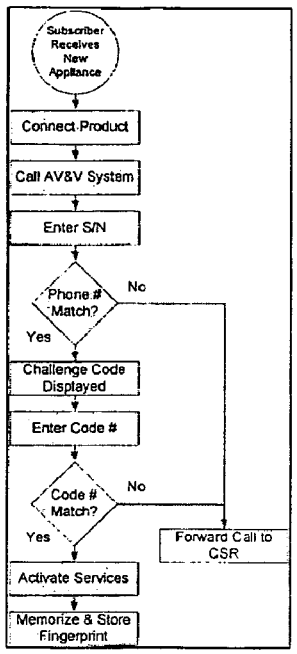

Fig. 8 Digital cable appliance activation process

Operational Scenario

Regardless of the specific details associated with the implementation of the algorithm to calculate the fingerprint value, an operationally practical means of deploying a system employing RF fingerprint technology is necessary. Such a system must be automated to the greatest extent possible in order to reduce operating costs and to maximize flexibility. The practical implementation of a system employing RF fingerprinting is as follows:

1. A subscriber receives a fingerprint equipped appliance from the cable operator. The product contains labeling indicating "Call XXX-XXX-XXXX from your home phone after connecting the device to both the cable network and television for activation". This is identical in concept to the process now followed for activation of home satellite television receivers and credit or ATM cards issued through mail by the major financial institutions.

2. The subscriber follows the instructions and calls the number on the appliance label after installation, as indicated. An automated validation and activation (AV&V) system at the cable operator receives the call and prompts the subscriber to enter the serial number of the cable appliance using the keypad on the telephone and to press the "#" key upon completion.

3. Upon receiving the "#" key input, the AV&V system confirms the validity of the entered appliance serial number. The system then looks through its subscriber database and finds the record for the subscriber issued the appliance having the entered serial number. It then reads the subscriber's home phone number from the database record. Using Automated Number Identification (ANI), a non-maskable form of caller identification used for logging calls to toll-free telephone numbers (and 911 calls), the AV&V system then confirms a match between the number of record and if unsuccessful, refers the call to a customer service agent. This step validates that an authorized subscriber is attempting to activate the appliance issued to them by the cable operator.

4. If the ANI and phone number on record match, the AV&V system then sends a control message (EMM) to the appliance having the serial number the subscriber entered by phone. This EMM commands the appliance to display, on the subscriber's television screen, a challenge number sequence contained within the EMM message and generated at random by the AV&V system. The AV&V system then instructs the subscriber to enter into the telephone, the number displayed on the screen using the keypad on the telephone and to press the "#" key upon completion.

5. Upon receiving the "#" key input, the AV&V system confirms the validity of the entered challenge number and if unsuccessful, refers the call to a customer service agent. This step validates that the authorized subscriber is attempting to activate the appliance issued to them by the cable operator at the home on record.

6. If the challenge sequence is successful, the AV&V system sends another EMM to the now validated appliance, commanding it to perform two steps:

A. Activate the services authorized for that subscriber

B. Calculate the RF fingerprint for the appliance at the present location and store it in persistent memory.

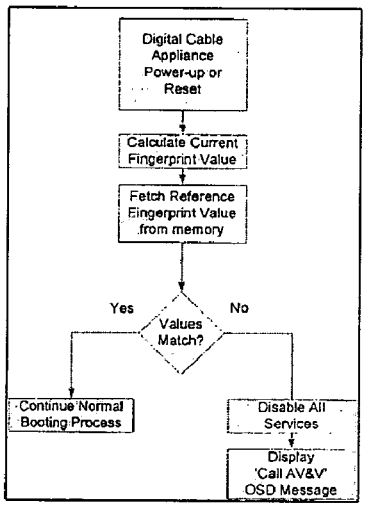

Fig. 9 Digital cable appliance location audit process at reboot

At periodic audit intervals, determined either by EMM or through self-initiation, which uses a timer resident in software, the appliance collects data and calculates an electronic fingerprint value, comparing it to the reference value stored in memory. If the calculated value is within predetermined limits, no further action is taken until the next audit period. If the new value for the fingerprint is sufficiently different from the stored reference value, then the reference value in memory is updated with the new reference value.

Whenever the appliance is rebooted or otherwise reset, signifying a lapse in network connectivity where the appliance may have been relocated without the authorization of the cable operator, the appliance collects data and calculates an electronic fingerprint value, comparing it to the reference value stored in memory. If the calculated value is within predetermined limits, the device continues the booting process and services are restored. If the match is unsuccessful, all television services are automatically self-deauthorized on the appliance, with an on-screen message generated and displayed on the subscriber's television screen indicating that the cable operator must be contacted at the AV&V telephone number contained within the message for appliance reactivation. This message occurs because the appliance has determined that an unauthorized relocation has possibly occurred. When the subscriber calls the displayed telephone number, the AV&V process is executed and upon validation, the location of the device is re-evaluated.

CONCLUSION

RF fingerprinting technology is one element in the toolkit available to address issues of service and equipment theft in cable television systems. Implemented in a digital decoder and coupled with simple content encryption techniques, a complete solution providing both the quality of service seen in an all-digital network as well as the system security and compensation for services delivered previously encountered only in premium digital services. All this is possible in the lowest possible cost, one-way customer premises equipment. The implementation of RF fingerprinting does not add hardware cost to the cable device and can be implemented in any digital device attached to a cable television network.

On-going development of this technology continues to focus upon optimization of weighting matrices as the technology is matured. One major U.S. cable operator has already specified the inclusion of this technology in their current system upgrades to all-digital delivery and draft specifications of the management and control aspects have been recently completed. It is quite likely that within the next 18 months, a commercial example of RF fingerprinting technology will be available and in the hands of the public.

REFERENCES

[1] ITU-T Rec. J.83:1997, *Digital multi-programme systems for television, sound and data services for cable distribution.* Geneva: International Telecommunication Union, Apr. 1997.

[2] ISO/IEC 13818-1:2000, *Information Technology – Coding of moving pictures and associated audio – Part 1: Systems.* Geneva: International Organization for Standardization/International Electrotechnical Commission, Dec. 2000.

[3] B. P. Lathi, *Signals, System and Controls.* New York: Harper & Row, 1974, pp. 207-214 & pp. 428-456.

[4] A. Bruce Carlson, *Communication Systems*, $3^{rd}$ ed. New York: Mc Graw-Hill, 1986, pp. 514-517 & pp. 550-554.

[5] Edward A. Lee and David G. Messerschmitt, Digital *Communication*, $2^{rd}$ ed. Boston: Kluwer Academic, 1994, pp. 442-550.

[6] Richard E. Blahut, *Digital Transmission of Information.* New York: Addison-Wesley, 1990, pp. 159-170.

What is claimed is:

1. A method of auditing operation of a cable television appliance, comprising:

detecting an event that triggers an audit;

generating a fingerprint value, wherein the fingerprint value is function of the cable television network characteristics at an authorized installation location, and wherein the fingerprint is a function of at least one of a gain value of a variable gain amplifier and an equalizer coefficient of an adaptive equalizer of the cable television appliance;

comparing the fingerprint value with a stored reference value to determine if the fingerprint value is within a range of specified value limits of the stored reference value;

if the fingerprint value is within specified limits of the stored reference value, permitting the cable television appliance to carry out a normal operational function; and if the fingerprint value is outside of specified limits of the stored reference value, inhibiting the cable television appliance from carrying out a normal operational function.

2. The method according to claim 1, further comprising storing the fingerprint value for use as the stored reference values in a subsequent audit.

3. The method according to claim 1, wherein if the fingerprint value is outside of specified limits of the stored reference value, sending an output signal that produces an on-screen message with instructions on contacting a cable television supplier.

4. The method according to claim 1, wherein the stored reference value is stored as a fingerprint value obtained during an activation process for the cable television appliance.

5. The method according to claim 1, wherein the fingerprint is a function of equalizer coefficients and gain values of an adaptive equalizer and variable gain amplifiers of the cable television appliance, and wherein an equalizer coefficient is represented by $a \pm jb$, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of gain coefficients; and wherein the fingerprint is given by Fingerprint(t)=$Y(H_1, H_2)$.

6. The method according to claim 1, wherein the event comprises one of the following: expiration of an internal timer of the cable television appliance; power-up of the cable television appliance; rebooting of the cable television appliance; receipt of command from a source external to the cable television appliance.

7. The method according to claim 1, wherein the fingerprint comprises equalizer coefficients of an adaptive equalizer of the cable television appliance.

8. The method according to claim 1, wherein the fingerprint comprises gain coefficient values of a variable gain amplifier of the cable television appliance.

9. The method according to claim 1, wherein the fingerprint comprises a function of at least one gain coefficient value of an AGC loop of the cable television appliance.

10. The method according to claim 1, wherein the fingerprint comprises a weighting function of at least one of the following: at least one equalizer coefficient of an adaptive equalizer of the cable television appliance and at least one gain coefficient value of an AGC loop of the cable television appliance.

11. A computer readable storage medium storing instructions which, when executed on a programmed processor, carry out an audit process according to claim 1.

12. A method of auditing operation of a cable television appliance, comprising:

detecting an event that triggers an audit;

generating a fingerprint value, wherein the fingerprint value is function of the cable television network characteristics at an authorized installation location;

wherein the fingerprint value comprises a function of at least one of the following: at least one equalizer coefficient of an adaptive equalizer of the cable television appliance and at least one gain coefficient value of an AGC loop of the cable television appliance;

comparing the fingerprint value with a stored reference value to determine if the fingerprint value is within a range of specified value limits of the stored reference value;

if the fingerprint value is within specified limits of the stored reference value, permitting the cable television appliance to carry out a normal operational function and storing the fingerprint value for use as the stored reference values in a subsequent audit; and if the fingerprint value is outside of specified limits of the stored reference value, inhibiting the cable television appliance from carrying out a normal operational function.

13. The method according to claim 12, wherein if the fingerprint value is outside of specified limits of the stored reference value, sending an output signal that produces an on-screen message with instructions on contacting a cable television supplier.

14. The method according to claim 12, wherein the stored reference value is stored as a fingerprint value obtained during an activation process for the cable television appliance.

15. The method according to claim 12, wherein the fingerprint is a function of equalizer coefficients and gain values of an adaptive equalizer and variable gain amplifiers of the cable television appliance, and wherein an equalizer coefficient is represented by $a \pm jb$, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of AGC coefficients; and wherein the fingerprint is given by Fingerprint(t)=Y($H_1$, $H_2$).

16. The method according to claim 12, wherein the event comprises one of the following: expiration of an internal timer of the cable television appliance; power-up of the cable television appliance; rebooting of the cable television appliance; receipt of command from a source external to the cable television appliance.

17. A computer readable storage medium storing instructions which, when executed on a programmed processor, carry out an audit process according to claim 12.

18. A self auditing cable television appliance, comprising:
means for detecting an event that triggers an audit;
means for generating a fingerprint value, wherein the fingerprint value is function of the cable television network characteristics at an authorized installation location, and wherein the fingerprint is a function of at least one of a gain value of a variable gain amplifier and an equalizer coefficient of an adaptive equalizer of the cable television appliance;
a memory that stores a reference value;
a processor for comparing the fingerprint value with the stored reference value to determine if the fingerprint value is within a range of specified value limits of the stored reference value, wherein:
if the fingerprint value is within specified limits of the stored reference value, the cable television appliance carries out a normal operational function; and
if the fingerprint value is outside of specified limits of the stored reference value, means for inhibiting the cable television appliance from carrying out a normal operational function.

19. The apparatus according to claim 18, further comprising means for storing the fingerprint value in the memory for use as the stored reference values in a subsequent audit.

20. The apparatus according to claim 18, wherein if the fingerprint value is outside of specified limits of the stored reference value, means for sending an output signal that produces an on-screen message with instructions on contacting a cable television supplier.

21. The apparatus according to claim 18, wherein the stored reference value is stored as a fingerprint value obtained during an activation process for the cable television appliance.

22. The apparatus according to claim 18, wherein the fingerprint is a function of equalizer coefficients and gain values of an adaptive equalizer and variable gain amplifiers of the cable television appliance, and wherein an equalizer coefficient is represented by a±jb, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients; and the gain value of one of a plurality of variable gain amplifiers is given by k, then $H_2$, the matrix of all gain values representing the state of the system at one point in time can be represented by:

$$H_2 = \begin{bmatrix} k_0 \\ k_1 \\ \ldots \\ k_l \end{bmatrix}$$

where l is the number of AGC coefficients; and wherein the fingerprint is given by Fingerprint(t)=Y($H_1$, $H_2$).

23. The apparatus according to claim 18, further comprising a timer, and wherein the event comprises expiration of the timer.

24. The apparatus according to claim 18, wherein the event comprises one of power-up of the cable television appliance; rebooting of the cable television appliance; receipt of command from a source external to the cable television appliance.

25. The apparatus according to claim 18, wherein the fingerprint comprises equalizer coefficients of an adaptive equalizer of the cable television appliance.

26. The apparatus according to claim 18, wherein the fingerprint comprises gain coefficient values of a variable gain amplifier of the cable television appliance.

27. The apparatus according to claim 18, wherein the fingerprint comprises a function of at least one gain coefficient value of an AGC loop of the cable television appliance.

28. The apparatus according to claim 18, wherein the fingerprint comprises a weighted function of at least one of the following: at least one equalizer coefficient of an adaptive equalizer of the cable television appliance and at least one gain coefficient value of an AGC loop of the cable television appliance.

29. A self auditing cable television appliance, comprising:
an AGC loop circuit having a plurality of variable gain amplifiers, where the gain value of one of a plurality of variable gain amplifiers is given by k, and $H_2$, is the matrix of all gain values representing the state of the AGC circuit at one point in time can be represented by:

$$H_2 = \begin{bmatrix} k_0 \\ k_1 \\ \ldots \\ k_l \end{bmatrix}$$

where l is the number of AGC coefficients;

an equalizer circuit having a plurality of equalizer coefficients, wherein an equalizer coefficient is represented by $a \pm jb$, then $H_1$, the matrix of all equalizer coefficients representing the state of the system at one point in time can be represented by:

$$H_1 = \begin{bmatrix} a_0 & b_0 \\ a_1 & b_1 \\ \ldots & \ldots \\ a_n & b_m \end{bmatrix}$$

where n is the number of feedback coefficients and m is the number of feed forward coefficients;

means for detecting an event that triggers an audit, wherein the event comprises one of power-up of the cable television appliance, rebooting of the cable television appliance, receipt of command from a source external to the cable television appliance, and expiration of a timer;

means for generating a fingerprint value, wherein the fingerprint value is function of the cable television network characteristics at an authorized installation location, and wherein the fingerprint is given by Fingerprint(t)=Y($H_1$, $H_2$);

a memory that stores a reference value as a stored as a fingerprint value obtained during an activation process for the cable television appliance;

a processor for comparing the fingerprint value with the stored reference value to determine if the fingerprint value is within a range of specified value limits of the stored reference value, wherein:

if the fingerprint value is within specified limits of the stored reference value, the cable television appliance carries out a normal operational function;

if the fingerprint value is outside of specified limits of the stored reference value, means for inhibiting the cable television appliance from carrying out a normal operational function and sending an output signal that produces an on-screen message with instructions on contacting a cable television supplier; and a memory for storing the fingerprint value in the memory for use as the stored reference values in a subsequent audit.

\* \* \* \* \*

UNITED STATES PATENT AND TRADEMARK OFFICE
CERTIFICATE OF CORRECTION

PATENT NO. : 7,644,424 B2  Page 1 of 1
APPLICATION NO. : 11/085369
DATED : January 5, 2010
INVENTOR(S) : Pedlow, Jr. et al.

It is certified that error appears in the above-identified patent and that said Letters Patent is hereby corrected as shown below:

In column 5, line 29, delete "(O)" and insert -- (Q) -- therefor.

In claim 5, column 37, line 63, delete "1" and insert -- *l* -- therefor.

In claim 22, column 40, line 33, delete "1" and insert -- *l* -- therefor.

In claim 29, column 41, line 9, delete "1" and insert -- *l* -- therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,644,424 B2
APPLICATION NO. : 11/085369
DATED : January 5, 2010
INVENTOR(S) : Pedlow, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Sixteenth Day of November, 2010

David J. Kappos
*Director of the United States Patent and Trademark Office*